United States Patent [19]  
Echtler

[11] 4,088,155  
[45] May 9, 1978

[54] NON-PLUGGING PRESSURE TAP  
[75] Inventor: Joseph P. Echtler, Pittsburgh, Pa.  
[73] Assignee: The United States of America as represented by the United States Department of Energy, Washington, D.C.  
[21] Appl. No.: 407,389  
[22] Filed: Oct. 17, 1973  
[51] Int. Cl.² .............................................. F15D 1/02  
[52] U.S. Cl. ...................................... 138/41; 138/40; 73/200  
[58] Field of Search ..................... 138/40, 41; 210/314, 210/316, 318; 55/274, 518, 522; 73/200

[56] References Cited  
U.S. PATENT DOCUMENTS

| | | | |
|---|---|---|---|
| 161,336 | 3/1875 | Gray | 138/40 X |
| 232,948 | 10/1880 | Dernham | 210/318 |
| 335,366 | 2/1886 | Lee | 210/314 X |
| 458,768 | 9/1891 | Weightman | 210/318 |
| 515,788 | 3/1894 | O'Meara | 210/318 |
| 1,783,163 | 11/1930 | Griswold | 138/40 X |
| 2,654,659 | 10/1953 | Friedman | 138/40 X |

Primary Examiner—Richard E. Aegerter  
Assistant Examiner—James E. Bryant, III  
Attorney, Agent, or Firm—Dean E. Carlson; Kenneth L. Cage; Richard A. Lambert

[57] ABSTRACT

A pressure tap having utility in an environment of a solid-gas phase process flow includes a tubular coupling part having attached over a passage therethrough at an end opening thereof exposed to the flow a grating of spaced bars, and affixed internally across a passage therethrough so as to cover over an opening therein a screen which maintains contained within the passage between it and the grating a matrix of smooth spheres. The grating bars are so oriented by the disposition of the aforesaid end opening with respect to the flow such that accumulations of solids therebetween tending to bridge the opening are removed therefrom by the flow.

5 Claims, 2 Drawing Figures

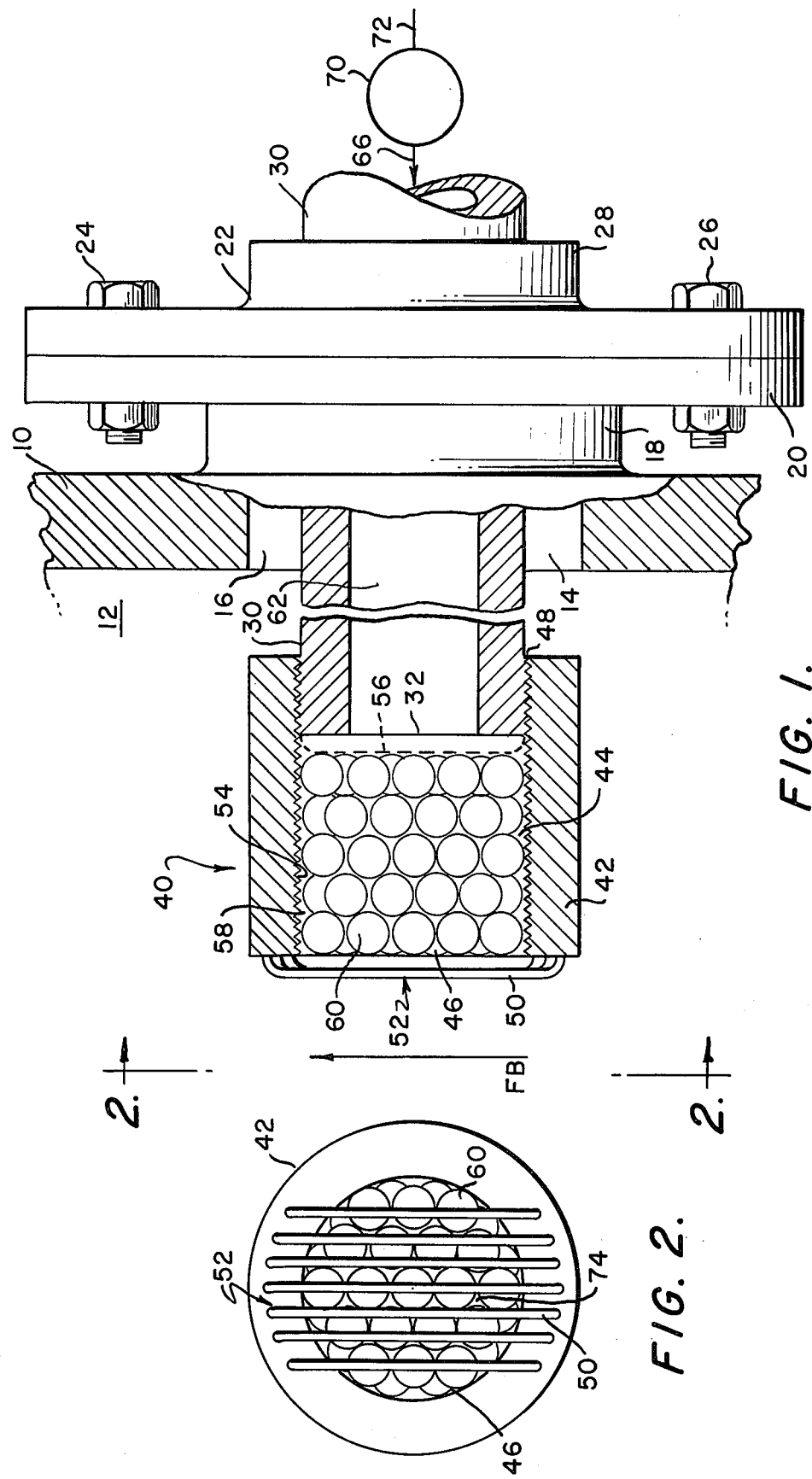

NON-PLUGGING PRESSURE TAP

The invention relates in general to an improvement in means to determine static or differential pressures in fluid mediums, and particularly in fluidized beds or any solids laden pulsating pressurized stream. A pressure tap component of such pressure determining means, which extends into the path of the fluidized flow, constantly intercepts and collects within its outer orifice solids of the stream such that this opening is eventually bridged with solids. Erroneous differential readings which results from such bridging are difficult to identify and determine as to magnitude because of the many factors contributing thereto. False readings may also be due to leaks in impulse lines, ruptured impulse lines, loss or change in flow rate of purge gas. However, bridging of solids within a pressure tap is the most serious problem because of the difficulty of its detection.

A pressure tap according to the present invention is continuously cleaned in the course of normal operation within a vessel confining therein a fluidized bed. Even in the event of an impulse line leak or rupture, or any other condition which might cause a backflow from the vessel against a purge gas, a bridge of solids would be released from the tap and thus be cleared without the use of a rod-out. This improved tap is essentially a short length of pipe coupling partially filled with smooth spheres or balls which are retained within the coupling by parallel bars spacially arranged over the orifice of the coupling ordinarily maintained in the path of the solids laden stream of the bed, and a screen inside the coupling. The bars are accordingly situated either across or preferably parallel to the normal movement of the solids in the fluidized bed and thus subject to an abrasive action of solids in turbulence which keeps the spaces between the bars cleared. When a backflow of hot process gas occurs, the entrained solids are trapped in those spaces defined between the spheres at the first interface with the fluid flow, although the smaller particles which may get through the first interface fall because of a loss of velocity. Consequently, when backflow of gas is stopped and purge gas is once more introduced, very little force is needed to dislodge the solids between the spheres at the interface.

Pressure taps heretofore standard for use in solid-gas phase processes, including those of hot fluidized beds of boiler generators, have provided unobstructed open passages from the flow environment to the pressure gage. The entrained solids of the process gas ae readily compacted in such open passages and introduce errors in pressure readings which are not easily detected. Moreover, a rupture or break in a line to such an open passage can become extremely hazardous to nearby operating personnel since hot process gas released is allowed to discharge hot solids into the surrounding area. The obstructing spheres of the pressure tap device disclosed herein avoid the deleterious compacting and the dangerous spraying of hot solids attendant to a line break or rupture. A pressure tap device comparable to that of the present invention appears to be unknown in the prior art. Grill structures in the nature of the parallel bar arrangement made applicable in the present invention have had utility in other fluid flow environments, such as over sewers or drains. A typical drainage grill is disclosed in U.S. Pat. No. 2,645,302, granted July 14, 1953, to S. P. Broussard et al., where the grille surmounts a sewer housing, and sets of pivotally mounted blades therein are disposed immediately below the grille. The blades are actuated by linkages driven by bucket wheels rotatably mounted in the housing where they are operable by flow past the grille and through the housing. The operated blades break up accumulations of solids at the grille which would otherwise bridge the openings in the grille, and work these solids through the housing. Movable spheres in retention have been also previously adapted for dislodging solids tending to disrupt the flow of fluid as appears in U.S. Pat. No. 3,425,562, granted Feb. 4, 1969, to E. A. G. Hamer, for a cleaning means in a water desalination reverse osmosis apparatus. Spheres described in this patent are confined within a tubular semipermeable membrane chamber supported within a porous tubular member where the spheres are free to move radially to a limited extent. Turbulence of liquid flow through the chamber impart rapid movements to the spheres which help disrupt the boundary layer film of solution in contact with the membrane so as to overcome deleterious polarization effects in the apparatus. However, this prior art does not reach the difficulties of maintaining requisite pressure sensing communication with gas flow having solids in suspension. The special arrangement of such structure in the present invention obtains therefor a clearing action due to the flow in conjunction with a unique action by spheres contained in the structure upon solids disposed from the flow.

It is therefore an object of the present invention to provide a self-cleaning metering connection having utility in a fluid stream of any solid-gas phase process.

Other features and advantages of the invention will appear from the following description thereof taken in connection with the drawing wherein:

FIG. 1 a fragmentary showing, partly in section, and partly schematic, of a pressure detecting installation at the wall of a pressurized vessel, which illustrates a tap of the invention wherein as it appears in an operational arrangement;

FIG. 2 is an elevational view of the probing end of the tap taken on line 2—2 of FIG. 1.

Reference to FIG. 1 of the drawing reveals in part an upright structural support which is indicative of an enclosure wall 10 of a vertically disposed pressure vessel 12 wherein the present invention is operative as disclosed herein. Confined within vessel 12 is a fluidized bed which is characterized by a high temperature solid-gas phase process flow of solid particles which are entrained in a turbulence accompanying high frequency alternations of compressive and decompressive forces of the fluidization in the bed. This pulsating bed is controlled to flow upward in vessel 12 by conventional means, and such flow is thus represented in FIG. 1 by the directional arrow FB. An opening 14 at the inside surface of wall 10 leads to a passage 16 extending through the wall and beyond into a relatively short pipe 18 which is integrally formed with the outside surface of wall 10, by welding or the like. The extended end of pipe 18 is ringed by a flange 20 having a central opening in which passage 16 reaches an opposite end opening thereof. Supported on the outer face of flange 20 is a further flange structure 22 having a circular distribution of bolt holes therein which are located adjacent to a peripheral edge thereof where these holes are positioned for alignment with a corresponding number of matching holes in flange 20. Fastenings, such as bolts 24 and 26, are accommodated in the aligned holes and secured by nuts in the usual manner so as to obtain a sealed closure at the contacting surfaces of the flanges.

Flange structure 22 includes a collar 28, made integral with the exposed, or outer face of the flange, having an opening therein which extends the passage centrally defined within the flange. An elongated pipe fitted within the extended passage of flange structure 22, and affixed thereto by welding or the like, constitutes a nipple 30 which spans passage 16 and projects through opening 14 of the pressure vessel so as to locate an end opening 32 thereof at about 2 to 5 inches within the vessel.

Nipple 30 is equipped with screw threads on its outer surface adjacent end opening 32 thereof so as to accommodate the fastening thereto of a pressure tap 40 whose construction and operation is in accordance with the present invention. This tap includes as an outer casing thereof a relatively short length of thick-walled tubular pipe coupling 42 wherein is defined a cylindrical conduit 44 extending between an orifice 46, and a further orifice 48, parallel thereto, at the respective ends of the coupling. Orifice 46 is traversed by a plurality of bars 50 which are generally parallel to each other, and evenly spaced one from the other, about the width of a bar to form a grating 52 which spreads fully across the orifice. Coupling 42 is internally threaded with screw thread 54, and set into conduit 44 thereof, at about one-third the length thereof from orifice 48, is a back-up plate in the form of a coarse, flat screen 56. This screen is securely held by its edge engagement with threads 54 so as to lie parallel to the plane of grating 52 and spread across the whole of the conduit passage. Thus, there is defined within conduit 44 a space 58, extending between the grating and screen, wherein are retained a multiplicity of smooth spheres 60 which are loosely packed so as to allow only small movements of the spheres within the space. As was hereinbefore indicated, internal screw threads 54 between screen 56 and coupling orifice 48 are engaged with screw threads on the end of nipple 30 adjacent its projected end opening 32. Hence the passage through coupling conduit 44 merges with a passage 62 which reaches outside vessel 12 by way of the extension of nipple 30 beyond its flange connection at collar 28.

Turning now to the schematic showing of FIG. 1, nipple 30 is seen coupled to a pipe 66 which in conjunction with the nipple constitute a pressure sensing impulse line to vessel 12. Pressure in vessel 12 is measured on the impulse line at a connection thereof to a conventional metering pump arrangement 70, such as by a rotameter, when a purge gas, as for example nitrogen, available from a source thereof on a supply line 72, is fed by the pump through the impulse line against the vessel pressure. Since a pressure difference normally not exceeding one inch of water obtains the purge gas flow through the impulse line, a pressure reading at the pump can be taken as the effective vessel pressure. Moreover, when a differential pressure measurement to be taken between taps spaced along the vessel is desired, the essentially same pressure variant at the respective sensing points cancel and are of no effect in the determination.

In the pulsating environment characterizing fluidized bed FB, compression and decompression at high frequency give rise to slugging forces on the bed's entrained particles which tend to compact them within openings of the vessel structure, including its pressure taps. Impulse lines leading to taps heretofore used presented bare openings to the flow such that the entrained particles easily entered and were eventually compacted therein. The resultant particle build-ups effectively narrowed such openings and consequently distorted the pressure readings taken therefrom. Compacted particles bridging tap openings are normally not dispersed by purging, whether it is intermittent or continuous, and resort to time consuming mechanical cleaning, such as rodding out, becomes necessary. On the other hand, uncertain pressure data and other operational drawbacks associated with plugged taps are avoided where the present invention is used since its self-cleaning feature effectively eliminates the aforementioned compacting of entrained particles at the tap openings in the fluidized bed.

With particular reference to FIG. 2, pressure tap 40 as made in accordance with the present invention is seen to provide at its opening which interfaces with the flow of bed FB, a cooperative association of spherical surfaces provided by a multiplicity of tangentially contacting spheres 60, constituting an intersticed curtain set up in orifice 46 of coupling 42, with a barrier formed by a grating 52 carried on the forward face of this coupling. Thus, entrained particles of the flow which engage the tap are initially disposed to come to rest on or between the spaced bars of grating 52. However, following each compression effect in the flow such disposed particles are removed by a scrubbing action of the fluidized bed moving across and through the grating during the decompression effect of the flow. Since particles of the solid phase of the flow do not accumulate about the grating, a compaction of such particles which could bridge grating bars 50, does not occur. The entrained particles of the flow not checked at grating 52, and reaching the intersticed curtain beyond, are trapped in spaces 74 defined by the spherical surfaces of this curtain and the interstices thereof to which the surfaces converge. Particles coming to rest in any space 74 during a compression effect in the flow, impede the advance of further particles to corresponding spaces beyond the curtain. Nevertheless, spheres 60 in conduit space 58 are of such size and number as to allow unimpeded fluid flow communication between vessel 12 and the impulse line, and with the protection of grating 52 at the tap opening, which minimizes the particles collecting in spaces 74, fluid flow at the interstices continues intact during every compression effect in the fluidized bed. Fluid flow remains unabated during decompression effects when purge gas in the impulse line, which is then at a pressure slightly above vessel pressure, is effective to drive such particles as did collect in space 74 back into the vessel. The facility in the present invention with which particles collected in spaces 74 are freed by application of conventional purging techniques, either intermittent or continuous, effectively avoids possible compaction of particles at the tap due to the slugging forces present in a pulsating fluidized bed.

An exemplary construction of a pressure tap assembly according to the present invention has a one-inch coupling 42 of 316 stainless steel, rated at 1000 psi, which is internally threaded with a one-inch nominal pipe thread 54. A 48 mesh screen 56 is fitted within this coupling so as to retain from 50 to 75 0.174 inch diameter steel balls 60 in space 58 adjacent a grating 52 of seven stainless steel bars 50, having corresponding uniform cross-sectional areas, and spaced from one another by about the width of a single bar in a parallel array affixed over the couling's forward orifice. An initial testing of this assembly was done on a fluidized char heater. After approximately 40 hours of operating time with this tap in place, there was no evidence of bridging, plugging or false reading. The temperature of the bed was approximately 1200° F, and the pressure was 2.5 to 3.0 psig. During this test attempts were made to force a plug by stopping the purge gas flow for periods up to 2 hours, and by line ruptures which were simulated by disconnecting the impulse line from the transmitter. After each attempt to plug the tap, purge gas was introduced into the pulse line at the initially prescribed flow rate and no significant deviation of pressure differential reading was observed. During two other 40 hour tests in a fluidized bed of 75% −8, mesh dolomite and 25% char at ambient temperature, and pressures of 55 psig, and 165 psig, respectively, all attempts to induce a plug or bridge failed.

Other modifications and variations in the details of the present invention are possible in light of the disclosure herein. Thus, the normally horizontal tap disclosed herein may be sloped or vertical where required by the construction of the pressure vessel, and the stainless steel identified for the parts of the invention exposed to hot process flow in the vessel may be exchanged for other materials which match the metallurgy of the process.

It is therefore to be understood that within the scope of the appended claims the invention may be practiced otherwise than as specifically described.

I claim:

1. A tap for a pressure determining means, said tap being adapted for use in the path of a solid-gas phase process flow contained in a vessel therefor, comprising a casing having a conduit providing a passage therethrough between opposite end openings thereof, one of said openings being adapted to be disposed in said path, and the other of said openings having connected thereto a fluid flow communicating means adapted to extend between said casing and said pressure determining means outside said vessel, a plurality of spaced bars attached to said casing over said one end opening thereof, and a perforated device affixed within said casing so as to screen fully said passage thereof, and a multiplicity of substantially uniform rounded elements enclosed within said passage between said spaced bars and said perforated device.

2. The pressure tap of claim 1 wherein said conduit is tubular and said openings reside in planes parallel to each other.

3. The pressure tap of claim 1 wherein said conduit is screw threaded internally, and said perforated device is a partition plate affixed in said conduit by connection with said threads thereof.

4. The pressure tap of claim 1 wherein said plurality of spaced bars constitute a grating comprising bars disposed in parallel over said one end opening of said casing.

5. The pressure tap of claim 1 wherein said rounded elements are spherically shaped.

* * * * *